Figure 1:
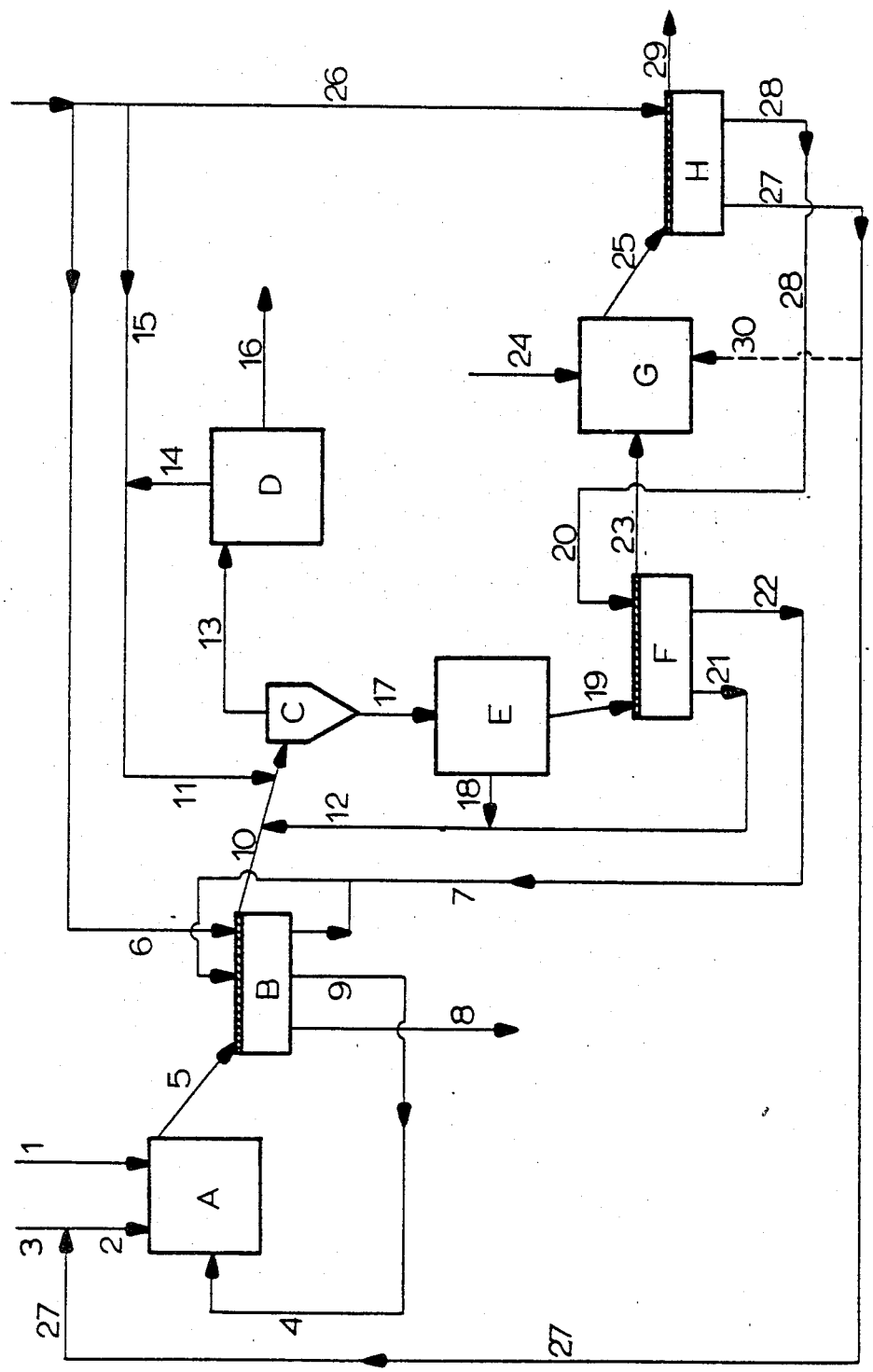

United States Patent [19]

Weterings

[11] 4,362,705
[45] Dec. 7, 1982

[54] PROCESS FOR THE PREPARATION OF PHOSPHORIC ACID AND CALCIUM SULPHATE ANHYDRITE AS WELL AS PHOSPHORIC ACID AND CALCIUM SULPHATE ANHYDRITE OBTAINED BY THIS PROCESS

[75] Inventor: Cornelis A. M. Weterings, Stein, Netherlands

[73] Assignee: Stamicarbon, B.V., Geleen, Netherlands

[21] Appl. No.: 283,723

[22] Filed: Jul. 15, 1981

[30] Foreign Application Priority Data

Jul. 15, 1980 [NL] Netherlands .......................... 8004058

[51] Int. Cl.$^3$ ............................ C01F 1/00; C01F 5/00; C01F 11/00; C01B 25/6
[52] U.S. Cl. .................................... 423/167; 423/166; 423/320
[58] Field of Search ................ 423/320, 166, 167, 555

[56] References Cited

U.S. PATENT DOCUMENTS 3,745,208   7/1973   Bigot et al. .......................... 423/167

*Primary Examiner*—O. R. Vertiz
*Assistant Examiner*—Gregory A. Heller

[57] ABSTRACT

Phosphate rock is digested with $H_2SO_4$ into phosphoric acid and gypsum, the latter is separated off, washed and converted into anhydrite. After this first wash the gypsum is divided into a minor portion of fine crystals, which is discharged, and into a major portion of coarse crystals, which is subjected to a second wash, thereafter recrystallized into anhydrite by means of concentrated $H_2SO_4$, the anhydrite being separated and washed and the recrystallization liquor returned to the digestion zone. The washing liquor obtained from the anhydrite wash is used for the second gypsum wash, the washing liquor obtained from this second wash is, together with water, used for the first gypsum wash, whereas the washing liquor obtained in this first wash is returned to the digestion zone. In this way practically all gypsum formed can be converted into anhydrite, while substantially all water can be functionally used without dilution of the $H_3PO_4$-product.

6 Claims, 1 Drawing Figure

PROCESS FOR THE PREPARATION OF PHOSPHORIC ACID AND CALCIUM SULPHATE ANHYDRITE AS WELL AS PHOSPHORIC ACID AND CALCIUM SULPHATE ANHYDRITE OBTAINED BY THIS PROCESS

The invention relates to a process for the preparation of phosphoric acid and calcium sulphate anhydrite in which phosphate rock is digested using sulphuric acid, the resulting mixture of phosphoric acid and calcium sulphate dihydrate is separated, the phosphoric acid is discharged as product, and the calcium sulphate dihydrate is recrystallized into calcium sulphate anhydrite by means of concentrated sulphuric acid at elevated temperature, this anhydrite is separated off and washed with water, and the remaining acid recrystallization liquor is returned to the phosphate digestion.

A process of this kind is known from U.S. Pat. No. 2,531,977. In the process described there, phosphate rock is dissolved in recirculated phosphoric acid, whereupon the mixture is converted into phosphoric acid and calcium sulphate dihydrate by means of sulphuric acid. Subsequently, the calcium sulphate dihydrate is filtered off and, using concentrated sulphuric acid, converted into calcium sulphate anhydrite, which is separated off, washed and discharged as product, while the remaining acid recrystallization liquor is recirculated to the phosphate digestion.

The disadvantage of this known process is that it is not possible to convert more than approximately half of the calcium sulphate dihydrate formed into anhydrite, since otherwise the total amount of water ending up in the recrystallization liquor in this conversion (water of hydration, adhering water, wash water) would become too large to be returned to the process together with the recrystallization liquor without adverse consequences. The surplus amount of water can be separated off and drained but this entails, besides environmental pollution on account of the sulphate and phosphate present in this water, a loss of phosphate. It is, in principle, true that the total amount of water could be recirculated. However, this has as disadvantages that the phosphoric acid produced is strongly diluted, the equipment in the phosphate digestion section is to be enlarged and possibly a larger capacity for concentrating the phosphoric acid is required.

The present invention provides a process for the preparation of phosphoric acid and calcium sulphate anhydrite allowing practically all of the dihydrate formed in the digestion to be converted into anhydrite and practically the total amount of water ending up in the recrystallization liquor in this conversion, including the wash water used, to be given a functional use in the process, without a dilution of the phosphoric acid produced occurring.

According to the invention this is accomplished by washing the dihydrate formed in the digestion and separating it into a relatively large amount of coarse fraction and a relatively small amount of fine fraction, discharging the latter from the process, subjecting the coarse fraction, after removal of part of the entrained liquor, to a second wash, using water and the sulphuric acid containing liquor obtained in the second dihydrate wash as wash liquor for the first dihydrate wash, using the sulphuric acid containing liquor obtained in the anhydrite wash as wash liquor for the second dihydrate wash, and passing the dilute, acid wash liquor obtained from the first dihydrate wash to the phosphate digestion.

In the process according to the invention the dihydrate formed in the phosphate digestion is separated from the phosphoric acid, preferably by filtration, washed with a special wash liquor (see below) and subsequently separated into a coarse fraction and a small amount of fine fraction, the latter being discharged from the process. By preference this separation is effected so that 5–15 wt. % of the dihydrate, in particular about 10 wt. %, is discharged as fine fraction, and 95–85 wt. %, in particular about 90 wt. %, is obtained as coarse fraction. The separation can be effected using one or more hydrocyclones. To keep the amount of liquid phase in the feed to the hydrocyclone section sufficiently large, an amount of water is preferably added to the dihydrate supplied. This water can be obtained by partially dewatering both the coarse fraction and the fine fraction discharged from the hydrocyclone, for instance in a thickener, and recirculating the water thus obtained, optionally together with an amount of water obtained from the separation device for the coarse dihydrate, preferably a filter, installed downstream of the hydrocyclone section. By preference a small amount, in particular approximately 10 wt. %, of pure water is added to this recirculated water.

The separation of the dihydrate into a fine and a coarse fraction offers, besides improvement of the water balance of the process, an added advantage in that the metals, fluorine and rare earths, as well as radium, present in the dihydrate are to an increased extent contained in the fine fraction. As a result a coarse fraction is obtained in which these components are present in a substantially lower concentration, which also prevents these components from accumulating in the process via the recirculation acid streams.

The fine fraction obtained in the separation may, preferably after dewatering, be drained as such. By preference, however, the metal contaminants of this fraction are recovered by means of an acid, in particular nitric acid. In doing so this fine dihydrate is optionally converted into hemihydrate or anhydrite, depending on the acid used and its concentration. The product purified of metal components may, for instance, be drained, or used for various technical purposes. Optionally, the purified product may also be recirculated to the phosphate digestion zone.

In the process according to the invention the anhydrite formed is separated from the sulphuric acid containing recrystallization liquor, preferably with the aid of a filter, and a subsequently washed with water. It has been found that a relatively small amount of wash water, for instance 25–30 parts by weight of water per 100 parts by weight of anhydrite, will suffice for this. The wash liquor thus obtained practically quantitatively contains the sulphuric acid adhering to the anhydrite and the phosphoric acid that may adhere to it. The sulphuric acid concentration of the liquor resulting after the anhydrite wash is 35 to 55 wt. %, depending on the sulphuric acid concentration in the recrystallization. According to the invention this acid liquor is used to wash the coarse dihydrate fraction (=second dihydrate wash). This wash yields a wash liquor that due to water absorption has a lower sulphuric acid concentration than the liquor resulting from the anhydrite wash, for instance a concentration of 15 to 30 wt. %. Together with pure water this wash liquor is used to wash the dihydrate separated off from the digestion liquor (first dihydrate wash). By preference the dihydrate is first washed with the sulphuric acid wash liquor and next with pure water, in such amounts that the total amount of wash liquor in this wash consists to 50-70 wt. % of pure water and to 50-30 wt. % of recirculated sulphuric acid wash liquor. The wash liquor obtained in the wash with pure water is preferably added to the recirculated acid wash liquor originating from the second dihydrate wash. The wash liquor obtained in this first dihydrate wash, containing, besides 8 to 15 wt. % of $H_2SO_4$, a substantial amount of phosphoric acid, for instance 15 wt. %, calculated as $P_2O_5$, is subsequently recirculated to the phosphate digestion.

In the process according to the invention the phosphate rock is digested with a mixture of recirculated, dilute wash liquor, containing sulphuric acid and phosphate, and recirculated recrystallization liquor containing sulphuric acid. The sulphuric acid concentration of the latter liquor depends on the concentration of the sulphuric acid fed to the recrystallization, the water content of the dihydrate to be recrystallized, and the sulphuric acid—dihydrate weight ratio. By preference the recrystallization is effected using concentrated 96-98 wt. % technical-grade sulphuric acid, and the weight ratio between the amounts of sulphuric acid and dihydrate to be recrystallized is chosen so that the liquid phase of the recrystallization mixture has a sulphuric acid concentration of 20-65 wt. %, in particular 45-60 wt. %.

It has been found that to achieve a good phosphate digestion efficiency and an optimum water balance it is of advantage to supply a smaller portion of the fresh sulphuric acid to the digestion zone. By preference, therefore, 15-25 wt. % of the concentrated sulphuric acid is supplied to the digestion zone, and 85-75 wt. % to the recrystallization zone.

The phosphoric acid obtained in the process according to the invention is more or less concentrated, depending on the water content of the sulphuric acid digestion liquor applied. By preference the reaction conditions of the digestion are chosen so that a phosphoric acid product having a $P_2O_5$ content of approximately 30% or more is obtained. This phosphoric acid can be processed further in a way known per se.

The anhydrite obtained in the process according to the invention can be treated in a known way, for instance dried. The product contains practically no phosphate, fluorine and metal contaminants and is particularly suitable for various industrial applications, for instance for the production of building elements, as setting time retarder for cement, coating in the paper industry, filler in the paper, paint and plastics industries, and as basic material for the preparation of technically pure calcium compounds, for instance calcium oxide or cement, and sulphur dioxide. By varying the acid concentration, the temperature and the residence time in the recrystallization zone, the average particle size and the bulk density of the anhydrite formed can be varied, while the average diameter of the product can be increased by having the recrystallization take place in the presence of polyvalent metal ions, as is described in the Dutch patent application No. 7,812,109.

The invention will be elucidated on the basis of the attached figure, which represents a diagrammatic embodiment of the process.

To digestion vessel A phosphate rock is supplied via 1, a digestion liquor, obtained by adding concentrated sulphuric acid via line 3 to an acid recrystallization liquor recirculated via line 27, via line 2, and recirculated wash liquor via line 4. Via line 5 a digestion slurry containing phosphoric acid and dihydrate is discharged to filter B, to which water is supplied via line 6 and a recirculated, acid wash liquor via line 7. Via line 8 phosphoric acid is discharged as product, and via line 9 an acid liquor containing phosphate and sulphuric acid, and this liquor is recirculated to digestion vessel A via line 4. Via line 10 wet dihydrate is passed from filter B to hydrocylone C. Water is supplied to line 10 via lines 11 and 12. Via overflow 13 an aqueous slurry of fine dihydrate is discharged from hydrocylone C, and said slurry is thickened in thickener D. Via line 16 a fine, wet gypsum fraction is discharged. From thickener D water is discharged via line 14, and this, mixed with pure water supplied via line 15, is recirculated to line 10 via line 11. Via line 17 a slurry of coarse dihydrate is sent from the bottom of hydrocyclone C to thickener E, and there it is partially dewatered. The water separated off is returned to line 10 via lines 18 and 12. Via line 19 the thickened dihydrate slurry is passed to filter F, to which an acid liquor supplied via line 20 is fed as wash liquor. Via lines 21 and 12 an amount of water from filter F is returned to line 10. As filtrate an acid liquor is discharged via line 22, and this liquor is recirculated to filter B via line 7. Via 23 a dihydrate filter cake is led from filter F to recrystallization vessel G, to which concentrated sulphuric acid is added via line 24. Via line 25 an anhydrite-containing acid liquor is sent to filter H, to which wash water is supplied via line 26. The strong sulphuric acid filtrate is recirculated to digestion vessel A via line 27, while the wash liquor containing sulphuric acid is returned to filter F via lines 28 and 20. Optionally, part of the strong sulphuric acid filtrate can be recirculated to vessel G via line 30. Wet anhydrite is discharged as product from filter H via 29.

EXAMPLE

In equipment as depicted in the FIGURE, but with two digestion vessels in series and two recrystallization vessels in series, per hour 78,750 kg of phosphate rock, having a $P_2O_5$ content of 33.5%, is introduced into reaction vessel A via 1, and via 2 95,490 kg of 65 wt. % $H_2SO_4$, obtained by mixing 83,925 kg of recirculated, 60 wt. % $H_2SO_4$ and 0.7% $P_2O_5$ containing recrystallization liquor, supplied via 27, with 11,560 kg of 98% $H_2SO_4$, supplied via 3. Furthermore, via 4 87,880 kg of recirculated wash liquor, containing 12.7% $H_2SO_4$ and 14.7% $P_2O_5$, is supplied. The temperature in vessel A is maintained at 75°-80° C. From vessel A the reaction liquor flows to an after-reactor A', the temperature of which is maintained at 75° C. From A' per hour 262,125 kg of reaction liquor is led to filter B via 5. As filtrate here 87,500 kg of phosphoric acid with a $P_2O_5$ content of 30% is discharged via 8. Via 6 60,500 kg of water and via 7 43,625 kg of acid wash liquor, having an $H_2SO_4$ content of 24.8% and a $P_2O_5$ content of 0.70%, are fed to the filter. Via 9 87,880 kg of acid wash liquor (12.7% $H_2SO_4$ and 14.7% $P_2O_5$) is discharged, and recirculated to vessel A via 4. As filter cake 186,250 kg of wet dihydrate, containing 53,750 kg of adhering water and having a $P_2O_5$ content of 0.5%, is led to hydrocyclone C via 10. To 10 446,250 kg of water is supplied, which has been obtained by mixing 450,375 kg of returned water (see below) with 40,875 kg of pure water via 15, while 45,000 kg of water is drained. Via overflow 13 132,500 kg of dihydrate slurry, containing 13,250 kg of dihydrate and 119,250 kg of water, is led to thickener D, from which 99,375 kg of water is recirculated to 10 via 14 and 11. As drain from D a thickened slurry of 13,250 kg of dihydrate and 19,875 kg of water is discharged via 16. From the bottom of hydrocyclone C a solution consisting of 119,250 kg of dihydrate and 380,750 kg of water is passed via 17 to thickener E, from which 202,625 kg of water is recirculated to 10 via 18 and 12, while 296,875 kg of an approximately 40 wt. % dihydrate slurry (118,750 kg of dihydrate and 178,125 kg of water) is led to filter F. Via 20 52,500 kg of an acid liquor having an $H_2SO_4$ content of 50% and a $P_2O_5$ content of 0.61% is supplied to this filter as wash liquor. From F 148,375 kg of water is discharged via 21, and this water is recirculated to 10 via 12. Via 22 43,625 kg of acid liquor (24.8% $H_2SO_4$ and 0.70% $P_2O_5$) is returned to filter B. An amount of 157,375 kg of filter cake, consisting of 118,750 kg of dihydrate and 38,625 kg of adhering liquor (40% $H_2SO_4$) is led to recrystallization vessel G via 23, to which further 62,460 kg of 98% $H_2SO_4$ is added. The $H_2SO_4$ concentration, calculated relative to the amount of liquid phase, in vessel G is 60%. The residence time of the mixture in the vessel is approximately 2.5 hours, while the temperature is maintained at 45° C. From vessel G the mixture flows to after-reaction vessel G', in which the temperature is also maintained at 45° C. and from which an amount of reaction mixture is continuously recirculated to vessel G. From G' 222,200 kg of slurry containing 94,430 kg of anhydrite and 127,770 kg of adhering liquor (60% $H_2SO_4$) is led to filter H via 25, to which further 41,250 kg of water is fed via 26. Via 27 83,925 kg of acid liquor (60% $H_2SO_4$, 0.7% $P_2O_5$) is returned to digestion vessel A. Via 28 52,500 kg of acid wash liquor (50% $H_2SO_4$, 0.61% $P_2O_5$) is recirculated to filter F. The filter cake is discharged as anhydrite product via 29. An amount of 127,000 kg of product is obtained, consisting of 94,430 kg of anhydrite and 32,570 kg of adhering water.

I claim:

1. A process for the preparation of phosphoric acid and calcium sulphate anhydrite comprising the steps of,
   (a) digesting phosphate rock with a digesting liquor comprising sulphuric acid from the sulphuric and phosphoric acid liquor of step (d) and the acid recrystallization liquor of step (j) to form a resultant mixture comprising phosphoric acid and calcium sulphate dihydrate.
   (b) separating out said calcium sulphate dihydrate from said phosphoric acid.
   (c) discharging said phosphoric acid.
   (d) washing said separated calcium sulphate of step (b) with a wash liquid comprising water and an acid wash liquor from step (h) and passing the resultant sulphuric and phosphoric acid liquor to the phosphate digestion of step (a).
   (e) separating said washed calcium sulphate dihydrate of step (d), into a fine fraction and a coarse fraction.
   (f) discharging said fine fraction.
   (g) removing at least a portion of the entrained liquor from said coarse fraction.
   (h) washing said coarse fraction dihydrate of step (g) with a wash liquor containing sulphuric acid from step (k) and passing the resultant acid wash liquor to step (d).
   (i) recrystallizing said washed coarse fraction of step (h) with concentrated sulphuric acid at elevated temperature into calcium sulphate anhydrite.
   (j) separating said anhydrite from the acid recrystallization liquor and passing said acid recrystallization liquor to the phosphate digestion of step (a).
   (k) washing said separated anhydrite of step (j) with water and passing the wash liquid containing sulfuric acid to step (h).
   (l) discharging said calcium sulphate anhydrite.

2. Process according to claim 1, characterized in that the dihydrate obtained in the first wash is separated in step (e) so that 5-15 wt. % of the dihydrate is obtained as fine fraction and 95-85 wt. % as coarse fraction.

3. Process according to claim 2, characterized in that in the first dihydrate wash of step (d) a wash liquor is applied that consists of 50-70 wt. % of water and to 50-30 wt. % of sulphuric acid wash liquor obtained from the second dihydrate wash.

4. Process according to claim 3, characterized in that the amounts of wash water and recirculated wash liquor are chosen so that as wash liquor from the anhydrite wash of step k a 35-55 wt. % sulphuric acid solution is obtained, as wash liquor from the second dihydrate wash of step (h) a 15-30 wt. % sulphuric acid solution and as wash liquor from the first dihydrate wash of step d an 8-15 wt. % sulphuric acid solution.

5. Process according to claim 4, characterized in that together with the recrystallization liquor and the wash liquor from the first dihydrate wash of step (d) an amount of concentrated sulphuric acid is supplied to the phosphate digestion of step a.

6. Process according to claim 5, characterized in that 15-25 wt. % of the concentrated sulphuric acid is supplied to the phosphate digestion of step a and 85-75 wt. % to the dihydrate recrystallization of step i.

* * * * *